(12) United States Patent
Kim

(10) Patent No.: US 8,607,977 B2
(45) Date of Patent: Dec. 17, 2013

(54) KEYBOARD UNIT WITH CRADLING FUNCTION

(75) Inventor: Won-Tae Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/616,432

(22) Filed: Sep. 14, 2012

(65) Prior Publication Data

US 2013/0075300 A1 Mar. 28, 2013

(30) Foreign Application Priority Data

Sep. 27, 2011 (KR) .................. 10-2011-0097244

(51) Int. Cl.
*B65D 85/00* (2006.01)
(52) U.S. Cl.
USPC ........................... 206/320; 206/718; 206/722
(58) Field of Classification Search
USPC .................. 206/576, 320, 701, 718, 722, 723
See application file for complete search history.

(56) References Cited

U.S. PATENT DOCUMENTS

| 5,803,267 | A  | * | 9/1998  | Tu et al. ........................ 206/576 |
| 6,785,126 | B2 |   | 8/2004  | Hazzard et al. |
| 6,991,389 | B2 |   | 1/2006  | Mochizuki et al. |
| 7,339,783 | B2 | * | 3/2008  | McEwan et al. ......... 361/679.55 |
| 7,388,743 | B2 | * | 6/2008  | Lin ........................... 361/679.09 |
| 7,672,117 | B1 | * | 3/2010  | Gary et al. .............. 361/679.01 |
| 7,843,686 | B2 | * | 11/2010 | McEwan et al. ......... 361/679.55 |
| 2002/0179470 | A1 | * | 12/2002 | Lee ............................... 206/320 |
| 2003/0000857 | A1 | * | 1/2003  | Jones .......................... 206/320 |
| 2004/0124104 | A1 | * | 7/2004  | DeVolpi ...................... 206/320 |
| 2011/0011759 | A1 | * | 1/2011  | Luo ............................. 206/320 |
| 2011/0162987 | A1 | * | 7/2011  | Bekele ........................ 206/320 |
| 2011/0272305 | A1 | * | 11/2011 | Lee ............................... 206/320 |
| 2012/0048755 | A1 | * | 3/2012  | Tsao ............................ 206/320 |
| 2012/0181194 | A1 | * | 7/2012  | Mcewan et al. ............... 206/223 |

FOREIGN PATENT DOCUMENTS

JP        3082257 U       9/2001

* cited by examiner

*Primary Examiner* — Jacob K Ackun
(74) *Attorney, Agent, or Firm* — Cha & Reiter, LLC

(57) ABSTRACT

A keyboard unit adapted to provide a cradling function for a portable terminal includes: a keyboard and a keyboard case for receiving the keyboard to protect the keyboard from an external environment. The keyboard case has a cradling unit adapted for cradling a portable terminal after the keyboard is extracted from the keyboard case.

20 Claims, 6 Drawing Sheets

KEYBOARD UNIT WITH CRADLING FUNCTION

CLAIM OF PRIORITY

This application claims the benefit of the earlier filing date, under 35 U.S.C. §119(a), of an application entitled "Keyboard Unit With Cradling Function" filed in the Korean Intellectual Property Office on Sep. 27, 2011 and assigned Serial No. 10-2011-0097244, the entire contents of which is hereby incorporated by reference.

BACKGROUND OF THE INVENTION

1. Field of the Invention

The present invention relates to a keyboard unit for use to input data to a portable terminal, and more particularly, to a keyboard unit which is capable of being used as a cradling unit for the portable terminal.

2. Description of the Related Art

In general, a portable terminal refers to a portable information device, such as a cellular phone, a smart phone, a notebook computer, an MP3 player, a personal digital assistant (PDA), a tablet personal computer (PC). Such a portable terminal includes a data input unit and a data output unit, in which the data input unit typically employs a keypad or a keyboard having a plurality of keys, and the data output unit employs an LCD or AMOLED display device, or the like.

A stylus pen for inputting data, a cradle for inclinedly supporting a display unit, a small keyboard for convenient data input, a USB for storing desired data, etc. are examples of accessories for such a portable terminal Among the accessories, a user should carry the cradle for inclinedly supporting the body of the portable terminal A conventional cradle may be formed integrally with the portable terminal, or separately manufactured and carried together with the portable terminal Considering the portability of the terminal, such a cradle is configured to be small and light.

Separately from the portable terminal, a separate keyboard is used for inputting data conveniently. Such a separate keyboard provides a user with a QWERTY key arrangement for convenient data input, in which the keyboard may be kept in a separate leather case and used as an accessory for the portable terminal However, such a case merely performs a function for protecting the portable terminal or the keyboard.

That is, when using a keyboardless portable terminal, such as a tablet PC, there is an inconvenience in that a cradle and a keyboard, which are merely used as accessories, should be carried together with the portable terminal.

SUMMARY OF THE INVENTION

Accordingly, an aspect of the present invention solves the above-mentioned problems occurring in the prior art and provides a keyboard unit having a keyboard case that also provides a cradling function for a portable terminal so that data input can be conveniently performed, and output data can be conveniently viewed.

Another aspect of the present invention provides a keyboard unit which is capable of minimizing invasion of foreign matter into the keyboard as well as providing a cradling function.

Still another aspect of the present invention provides a keyboard unit which is useful for cradling a portable terminal, such as a tablet PC.

In accordance with an aspect of the present invention, there is provided a keyboard unit including: a keyboard; and a keyboard case for receiving and protecting the keyboard from an external environment, the keyboard case having a cradling unit adapted for cradling a portable terminal after the keyboard is extracted from the keyboard case.

In accordance with another aspect of the present invention, there is provided a keyboard unit including: a keyboard; and a keyboard case being open at opposite sides thereof for receiving the keyboard therein and thereby protecting the keyboard from an external environment, the keyboard case having a cradling unit adapted for cradling a portable terminal after the keyboard is extracted from the keyboard case, wherein the keyboard case includes: a planar bottom wall; first and second vertical walls extending upward from the opposite ends of the bottom wall, respectively; and a planar top wall extending parallel to the bottom wall from the top end of the second vertical wall toward, but not all the way, to a top end of the first vertical wall, so as to establish an open space in the top wall, and wherein the cradling unit is arranged in the open space between a free end of the top wall and the first vertical wall.

BRIEF DESCRIPTION OF THE DRAWINGS

The above and other aspects, features and advantages of the present invention will be more apparent from the following detailed descriptions taken in conjunction with the accompanying drawings, in which.

DETAILED DESCRIPTION OF THE INVENTION

Figure 1:
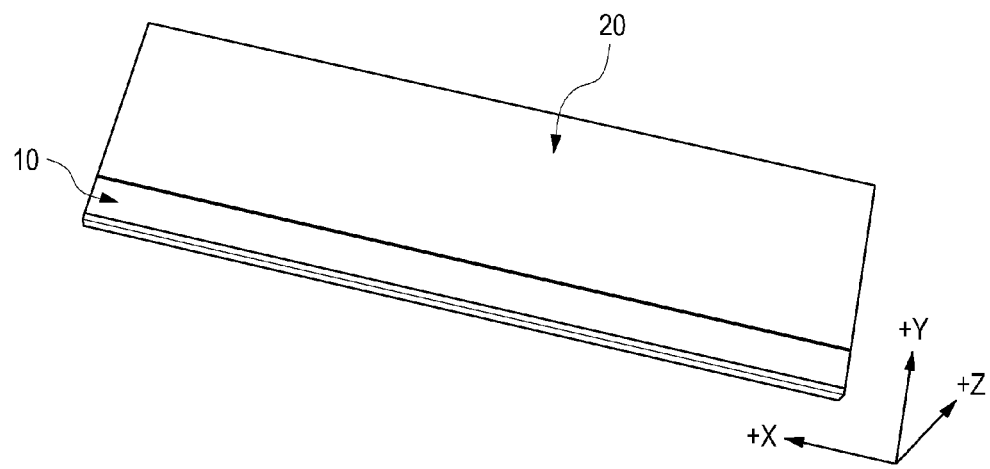
FIGS. 1 and 2 are perspective views illustrating a keyboard unit in accordance with the present invention as seen from different positions, respectively.

Hereinafter, embodiments of the present invention will be described with reference to the accompanying drawings. In the following description, the same or corresponding elements will be designated by the same reference numerals although they are shown in different drawings. Further, in the following description of the present invention, detailed descriptions of constructions or processes known in the art may be omitted to avoid obscuring the invention with unnecessary detail. Particular terms may be defined to describe the invention in the best manner. Accordingly, the meaning of specific terms or words used in the specification and the claims should not be limited to the literal or commonly employed sense, but should be construed in accordance with the spirit of the invention as described herein. The description of the various embodiments is to be construed as exemplary only and does not describe every possible instance of the invention. Therefore, it should be understood that various changes may be made and equivalents may be substituted for elements of the invention.

Figure 2:
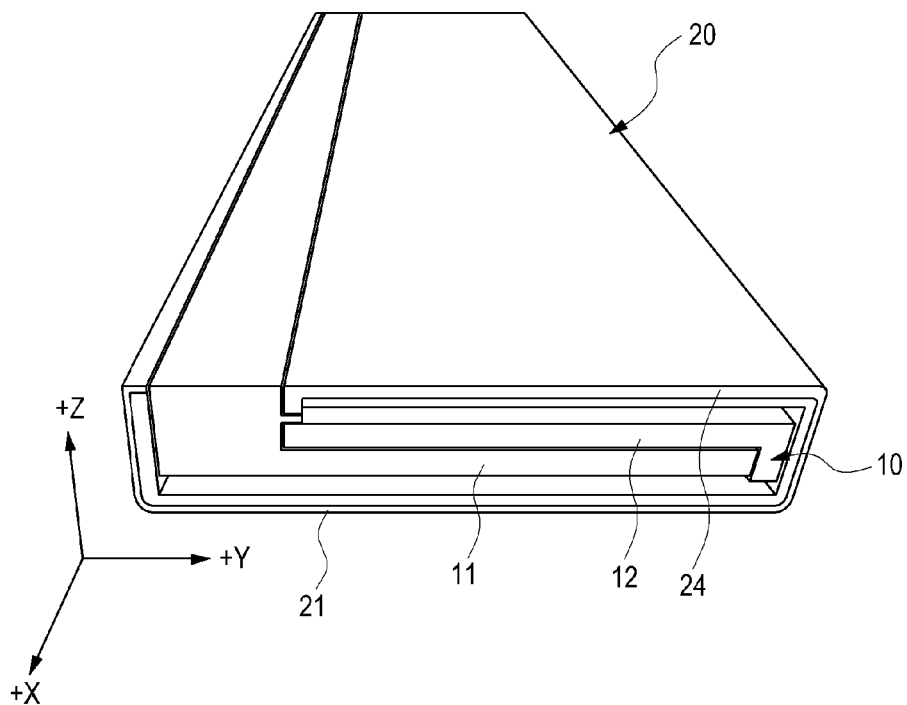

As shown in FIGS. 1 and 2, the inventive keyboard unit is a keyboard unit that provides a keyboard protection function as well as a portable terminal cradling function. That is, the keyboard unit includes a keyboard 10, and a keyboard case 20 to be also used for cradling. That keyboard case 20 is an auxiliary device for the keyboard 10, wherein the keyboard case 20 provides a keyboard protection function as well as a portable terminal cradling function. In particular, the keyboard case receives and protects the keyboard 10 from an external environment, and has a cradling unit 25 (see FIG. 3) to support a portable terminal inclinedly (or uprightly). The keyboard unit is provided with the keyboard case 20, which is separately fabricated, to protect the keyboard 10 from an external environment (invasion of foreign matter), and has the cradling unit capable of supporting a portable terminal inclinedly.

Figure 6:
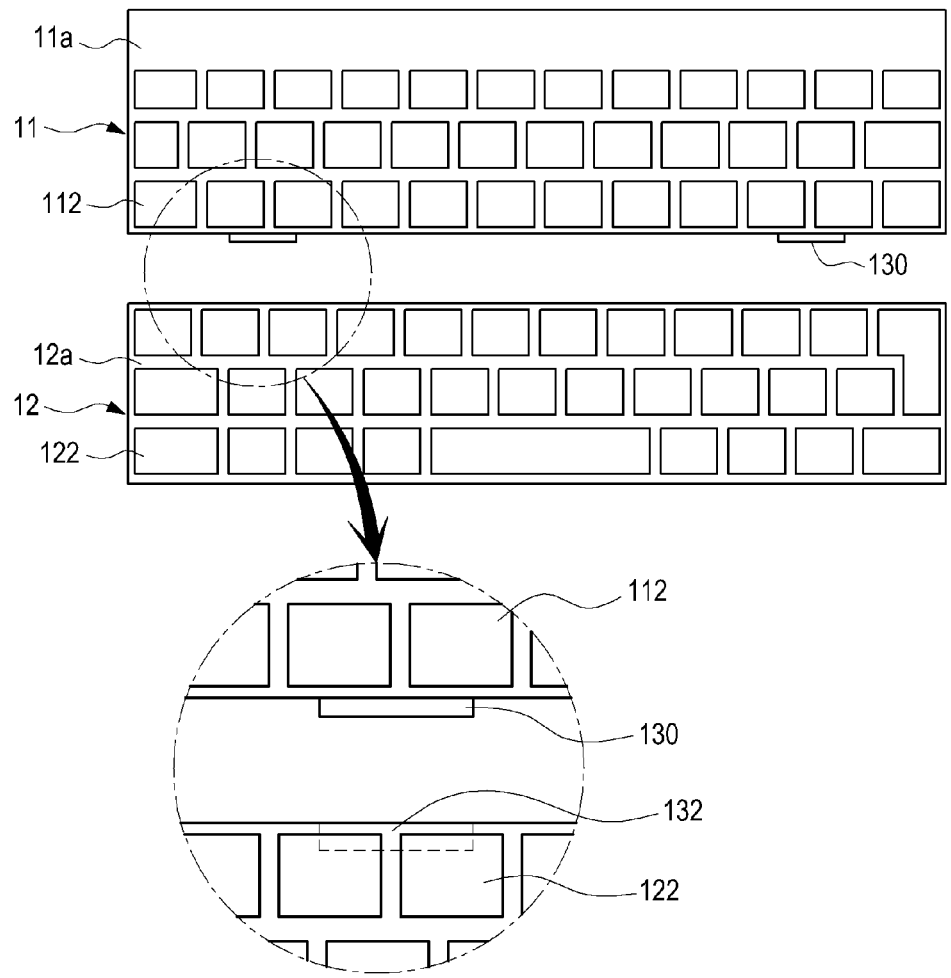
FIG. 6 is a top plan view illustrating the inventive first and second keyboards in a separated state.
Figure 7:
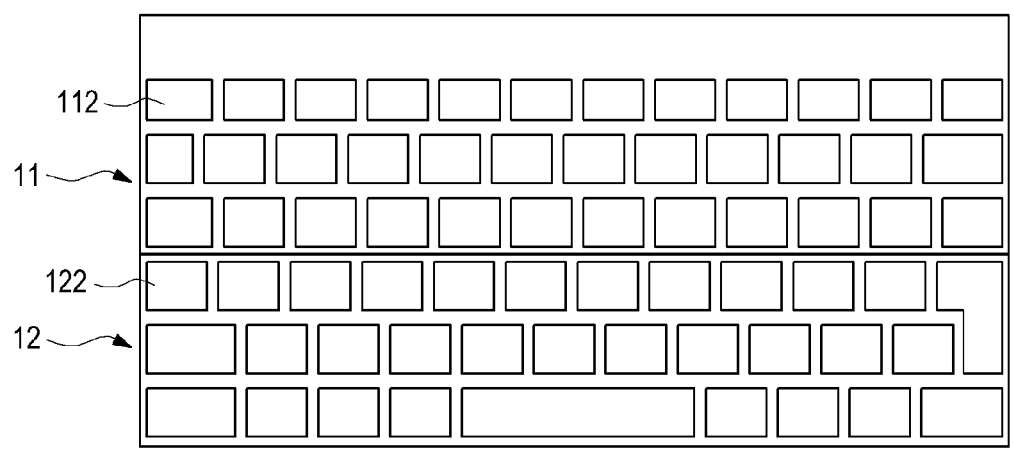
FIG. 7 is a top plan view illustrating the inventive first and second keyboards in a coupled state forming an integrated arrangement.

In addition, the keyboard 10 may be of the type shown in the illustrated embodiment as a separable type board, i.e. consists of first and second keyboards 11 and 12, wherein the first and second keyboards 11 and 12 are received in the keyboard case 20 as a single body, but in use, they may be extracted from the keyboard case 20 and then coupled to each other, so that they can be used in an integrated arrangement (see FIGS. 6 and 7). In other words, the keyboard 10 can be separated from the keyboard case 20 and used by wirelessly communicating with a portable terminal, and after the keyboard 10 is separated from the keyboard case 20, the keyboard case 20 can be used as a cradling unit capable of supporting a portable terminal.

Referring to FIGS. 1 and 2, the "X-axis," "Y-axis" and "Z-axis" indicate the widthwise (left and right), lengthwise, and vertical (thickness) directions of the keyboard case 20, respectively. In other words, "+X" and "−X" indicate the leftward and rightward directions, respectively, "+Y" and "−Y" indicate the frontward and backward directions, respectively, and "+Z" and "−Z" indicate the upward and downward directions, respectively. FIG. 2 shows a state in which the first and second keyboards 11 and 12 are safely received in the keyboard case.

Figure 3:
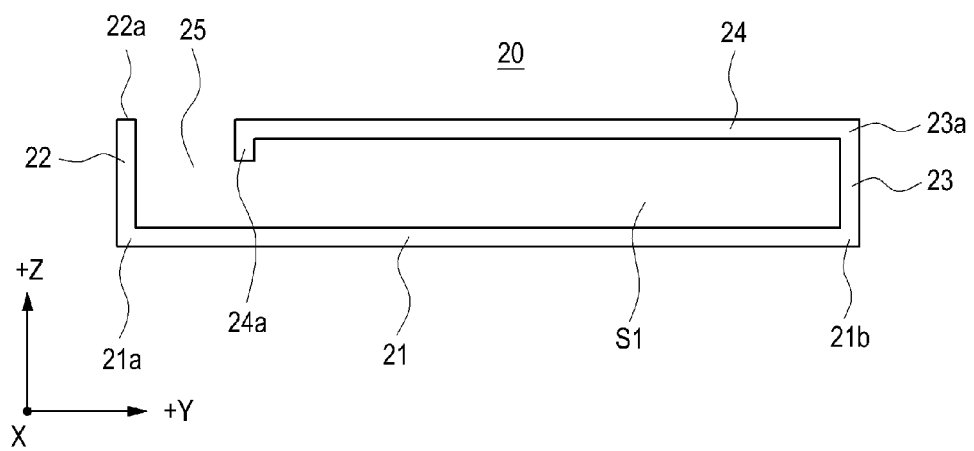
FIG. 3 is a side view illustrating the inventive keyboard unit.

Now, the construction of the keyboard case 20 will be described in detail with reference to FIG. 3. As shown in FIG. 3, the keyboard case 20 is formed from a rigid material, such as a rigid synthetic resin, and includes a bottom wall 21, a top wall 24, first and second vertical walls 22 and 23, and a cradling unit 25. The bottom wall 21 forms a planar bottom part. The first and second vertical walls 22 and 23 vertically extend from the opposite ends 21a and 21b of the bottom wall 21, respectively. The top wall 24 extends from the top end 23a of the second vertical wall 23 toward the top end 22a of the first vertical wall 22 in parallel to the bottom wall 21. The first and second vertical walls 22 and 23 are oppositely faced to each other, and the bottom and top walls 21 and 24 are also oppositely faced to each other. The cradling unit 25 is arranged between a free end 24a of the top wall 24 and the first vertical wall 22, and is formed as a top-opened (+Z direction) space, so that a predetermined part of a portable terminal can be inserted into the space and inclinedly cradled. The cradling unit 25 linearly extends in the widthwise direction (X-direction) as an opening in keyboard case 20. In addition, the keyboard case 20 is opened in the lengthwise direction (Y-direction) at the opposite sides thereof, so that the keyboard 10 can be slid through either of the opposite sides.

Figure 4:
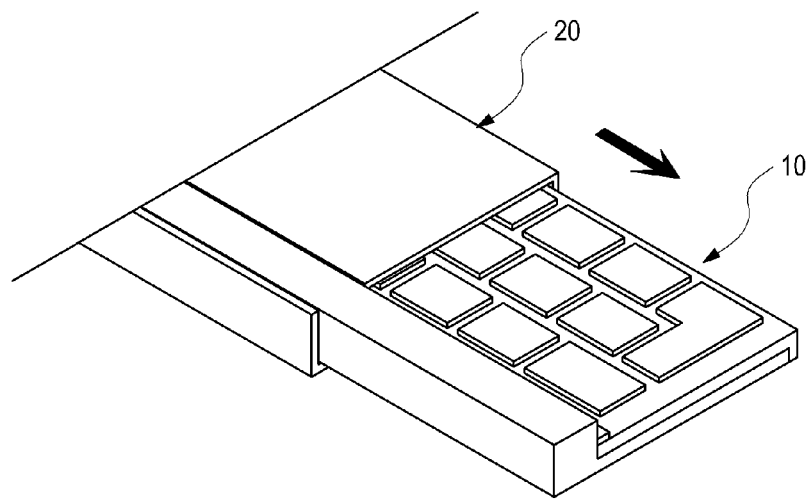
FIG. 4 is a perspective view illustrating a state in which a keyboard is being extracted from the inventive keyboard case.

As shown in the FIG. 4 embodiment, the keyboard 10 is received in or extracted from the keyboard case 20 by being manually slid in the widthwise direction while the first and second keyboards 11 and 12 are stacked with one another. The sliding movement is a linear movement. In addition, after being extracted from the keyboard case 20 by being moved in the state in which the first and second keyboards 11 and 12 are stacked and oppositely faced to each other in the inside of the keyboard case 20, the first and second keyboards 11 and 12 may be used in a separated state or in a integrally coupled state.

Figure 5:
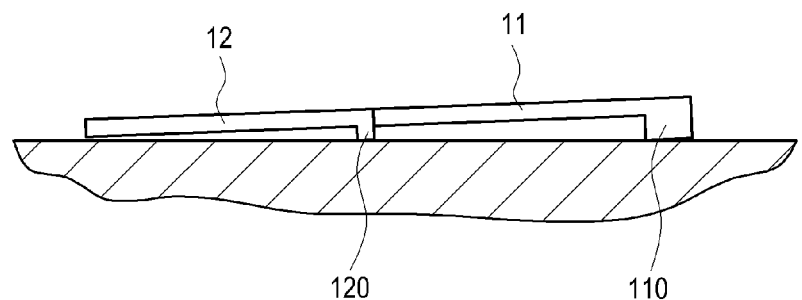
FIG. 5 is a side view illustrating partially in cross-section the inventive first and second keyboards coupled to each other to form an integrated arrangement and positioned on a desk.

FIGS. 5 to 7 show how the first and second keyboards 11 and 12 of the keyboard 10 may be used in a state of being separated from or coupled to each other after they are extracted from the keyboard case 20 in the direction indicated by an arrow in FIG. 4 (in the X-axis direction). The construction of the keyboard 10 will be described in detail with reference to FIGS. 5 to 7 together with FIGS. 2 and 3.

As described above, the keyboard 10 may consist of first and second keyboards 11 and 12 as shown in FIGS. 2 and 3. When the first and second keyboards 11 and 12 are received in the keyboard case 20, the second keyboard 12 is stacked on the first keyboard 11. That is, the first keyboard 11 is arranged in such a manner that its bottom side is oppositely faced to the bottom wall 21, and a part of the rear portion (first abutment) thereof occupies the cradling unit 25, and the second keyboard 12 is arranged in such a manner that its top side is oppositely faced to the top wall 24, and the bottom side is oppositely faced to the top side of the first keyboard 11.

Referring to FIG. 5, the first keyboard 11 has a first supporter 110 which has a vertically bent shape occupying the cradling unit (see FIG. 2) when it is received in the keyboard case 20. The first supporter 110 means a desk-top abutment. In addition, the second keyboard 12 has a second supporter 120 which wraps an end of the first keyboard 11 (see FIG. 2) when it is received in the keyboard case, and which is coupled to and supports the first keyboard 11 when it is extracted from the keyboard case 10. The second supporter 120 also means a desk-top abutment. When the first and second keyboards 11 and 12 are coupled to each other, the first and second supporter 110 and 120 support the first and second keyboards 11 and 12 in such a manner that the first and second keyboards 12 can be used as a single body. The first and second keyboards 11 and 12 are coupled to each other in such a manner that they can be inclinedly supported on a desk by the first and second supporter 110 and 120 in a state in which they are parallel to each other in the longitudinal (widthwise) direction thereof.

As shown in FIGS. 6 and 7, the first keyboard 11 has a plurality of first keys 112 on the bottom side 11a thereof, and the second keyboard 12 has a plurality of second keys 122 on the top side 12a thereof.

A coupling unit is provided between the first and second keyboards 11 and 12. The coupling unit serves to integrally couple the first and second keyboards 11 and 12. The first and second keys 112 and 122 are arranged in a QUERTY key arrangement. FIG. 7 shows the first and second keyboards 11 and 12 being coupled to each other and on which such a QWERTY key arrangement is provided. However, in accordance with a selected mode, only one of the first and second keyboards 11 and 12 may be used.

As shown in FIG. 6, the coupling unit may be formed in a protrusion-recess type of coupling, to couple the first and second keyboards 11 and 12 to each other, wherein at least one protrusion 130 may be provided on the first keyboard 11 and at least one slot 132 may be provided on the second keyboard 12 to be engaged with the protrusion 130. However, the protrusion 130 may be provided on the second keyboard 12 and the slot 132 may be provided on the first keyboard 11. The first and second keyboards 11 and 12 may be wirelessly connected to each other. In addition, the coupling unit may be formed by female and male connectors to be connected to each other through a wire, wherein the protrusion 130 and the slot 132 may be substituted by male and female connectors, respectively.

Figure 8:
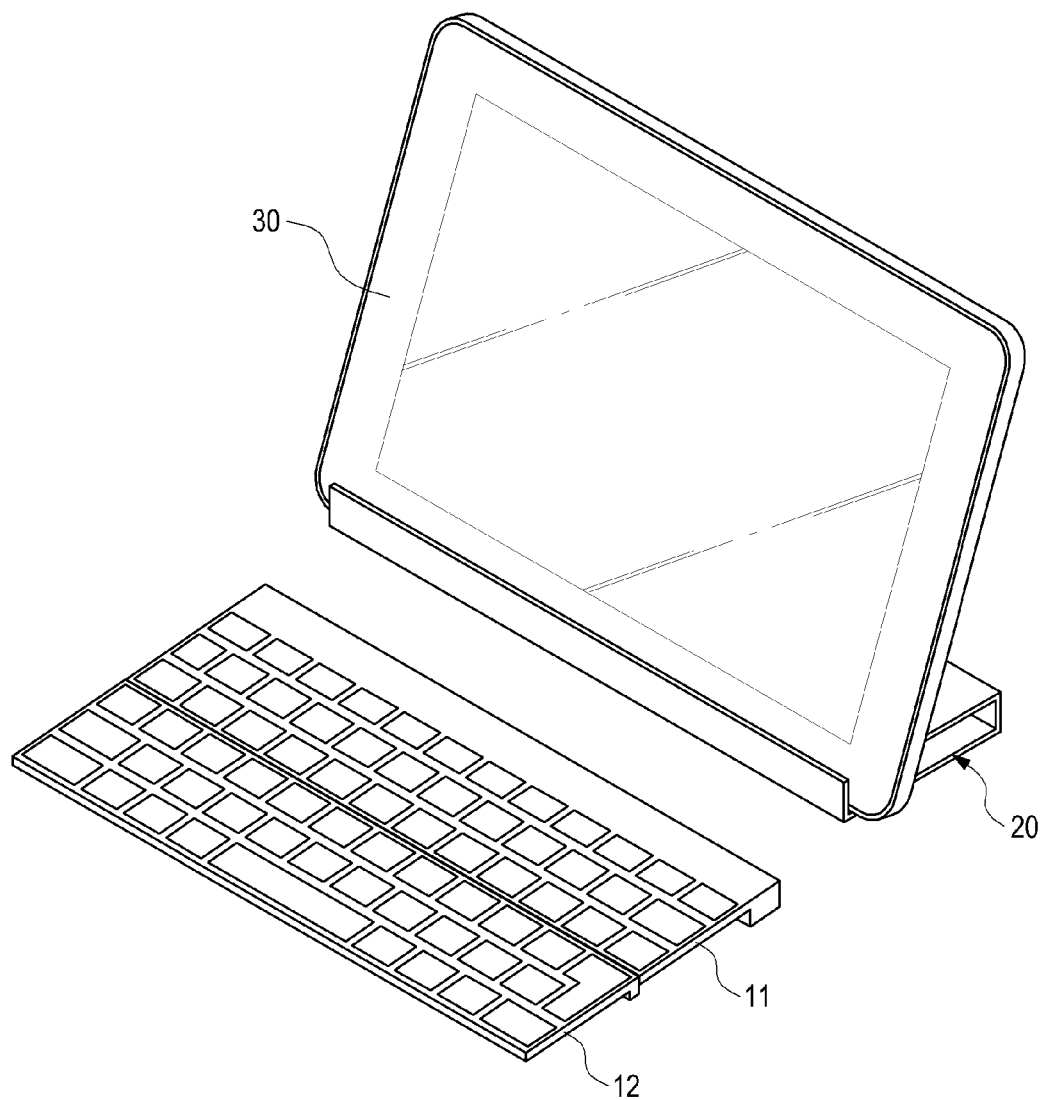
FIG. 8 is a perspective view illustrating the inventive keyboard unit in use with a portable terminal.

Referring to FIG. 8, there is shown a state in which the first and second keyboards 11 and 12 are coupled integrally to each other to form a single body after they are extracted from the keyboard case 20, and a portable terminal 30 is supported inclinedly in the cradling unit 25 on a desk. The portable terminal 30 may be a smart phone or a tablet PC. In addition, the first and second keyboards 11 and 12 provide a QWERTY key arrangement to assure convenient data input, wherein the keyboards wirelessly communicate with the portable terminal to allow desired data input.

Figure 9:
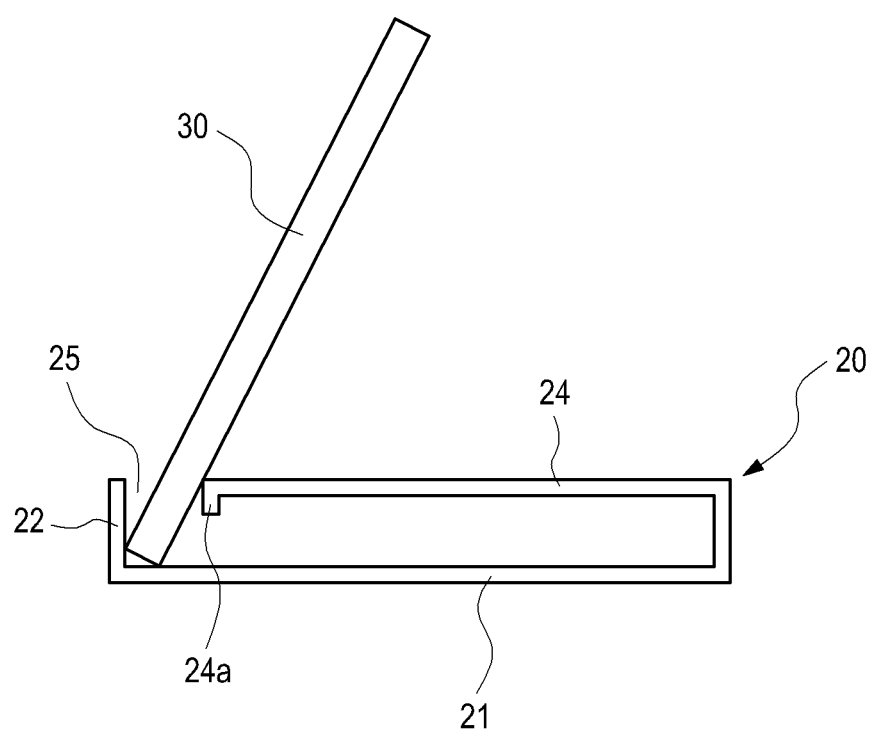
FIG. 9 is a side view showing a portable terminal inclinedly cradled in the inventive keyboard case.

If the portable terminal 30 is inclinedly inserted into the cradling unit 25 as shown in FIG. 9, the lower part of the first vertical wall 22 of the keyboard case, the end area of the bottom wall 21 positioned adjacent to the cradling unit 25, and the free end 24a of the top wall 24 come into contact with the portable terminal 30 to support the inclined state of the portable terminal.

As discussed above, the present invention employs a cradling unit in a keyboard case so as to assure a convenient use for a user, and to improve the convenience of use of the keyboard case as an accessory for a portable terminal, such as a tablet PC. In addition, the present invention makes the keyboard case so that it can completely receive a keyboard, so as to protect the keyboard from invasion of external foreign matter.

While the invention has been shown and described with reference to certain embodiments thereof, it will be understood by those skilled in the art that various changes in form and details may be made therein without departing from the spirit and scope of the invention as defined by the appended claims.

What is claimed is:

1. A keyboard unit comprising:
   a keyboard; and
   a keyboard case for receiving the keyboard to protect the keyboard from an external environment, the keyboard case having a cradling unit adapted for cradling a portable terminal after the keyboard is extracted from the keyboard case, wherein the keyboard is divided lengthwise along the longest width dimension to comprise first and second keyboard components stacked over each other when separated and housed in the keyboard case and configured to be supported in an inclined stance when coupled; and
   a coupling unit between the first and second keyboards for coupling and de-coupling the first and second keyboard component lengthwise along the longest width dimension after the keyboard is extracted from the keyboard case to provide an integrated arrangement and supporting communicating with the portable terminal in the cradling unit.

2. The keyboard unit as claimed in claim 1, wherein the cradling unit is provided as a shaped opening in the keyboard case and
   the stacked first and second keyboard components are removable by sliding from the sides of the keyboard case and the coupling unit electrically and physically coupling the first and second keyboard component.

3. The keyboard unit as claimed in claim 1, wherein the keyboard is configured as a separable keyboard, so that in a first state it can be received in the keyboard case in a stacked manner, and in a second state it can be separated from the keyboard case and used in a coupled manner.

4. The keyboard unit as claimed in claim 2, wherein the keyboard case comprises:
   a planar bottom wall;
   first and second vertical walls extending upward from the opposite ends of the bottom wall, respectively; and
   a planar top wall extending parallel to the bottom wall from the top end of the second vertical wall toward the top end of the first vertical wall.

5. The keyboard unit as claimed in claim 4, wherein the keyboard case is open at the opposite sides thereof, so that the keyboard can be slid in the widthwise direction of the keyboard case to be selectively inserted and extracted from the keyboard case.

6. The keyboard unit as claimed in claim 4, wherein the cradling part is arranged between a free end of the top wall and the first vertical wall, and extends in the widthwise direction of the keyboard case in a space having an open-top shape.

7. The keyboard unit as claimed in claim 4, wherein the separable keyboard comprises:
   a first keyboard; and
   a second keyboard received in the keyboard case in the first state in which the second keyboard is stacked with the first keyboard, and in the second state is extracted from the keyboard case so as to be capable of being used in one of the separated state or in the coupled state, with the first keyboard.

8. The keyboard unit as claimed in claim 7, wherein in the first state, the first keyboard is arranged in such a manner that its bottom side is oppositely faced to the bottom wall of the keyboard case and a part of the bottom side of the first keyboard occupies the cradling part of the keyboard case, and the second keyboard is arranged in such a manner that its top side is oppositely faced to the top wall of the keyboard case, and its bottom side is oppositely faced to the first keyboard.

9. The keyboard unit as claimed in claim 8, wherein the first keyboard is provided with a plurality of first keys arranged on the bottom side thereof, and the second keyboard is provided with a plurality of second keys arranged on the top side thereof.

10. The keyboard unit as claimed in claim 7, wherein the first keyboard further comprises:
    a first supporter formed in a vertically bent shape, wherein the first supporter occupies the cradling part when it is received in the keyboard case, and the first supporter is adapted to inclinedly support the first keyboard on a desk after it is extracted from the keyboard case.

11. The keyboard unit as claimed in claim 10, wherein the second keyboard further comprises:
    a second supporter formed in a vertically bent shape, wherein the second supporter wraps an end of the first keyboard when it is received in the keyboard case, and the second abutment inclinedly is adapted to support the second keyboard on the desk when it is extracted from the keyboard case.

12. The keyboard unit as claimed in claim 11, further comprising:
    an electrical wireless coupling between the first and second keyboard components.

13. The keyboard unit as claimed in claim 12, wherein the coupling unit comprises:
    one of at least one protrusion provided on the first keyboard and at least one slot provided on the second supporter adapted to be engaged with the protrusion, or
    female and male connectors provided on the first and second keyboard components, respectively.

14. The keyboard unit as claimed in claim 1, wherein the portable terminal is a smart phone or a tablet personal computer.

15. The keyboard unit as claimed in claim 4, wherein the keyboard case is formed from a rigid material.

16. A keyboard unit comprising:
a keyboard; and
a keyboard case being open at opposite sides thereof for receiving the keyboard therein and thereby protecting the keyboard from an external environment, the keyboard case having a cradling unit adapted for cradling a portable terminal after the keyboard is extracted from the keyboard case,
wherein the keyboard case comprises:
a planar bottom wall;
first and second vertical walls extending upward from opposite ends of the bottom wall, respectively; and
a planar top wall extending parallel to the bottom wall from a top end of the second vertical wall toward, but not all the way, to a top end of the first vertical wall, so as to establish an open space in the top wall, and
wherein the cradling unit is arranged in the open space between a free end of the top wall and the first vertical wall.

17. The keyboard unit as claimed in claim 16, wherein the keyboard comprises:
a first keyboard comprising a first supporter formed in a vertically bent shape, wherein the first supporter occupies the cradling unit when it is received in the keyboard case, and the first supporter is adapted to inclinedly support the first keyboard when positioned on a desk after it is extracted from the keyboard case; and
a second keyboard comprising a second supporter adapted for inclinedly supporting the second keyboard when positioned on the desk after it is extracted from the keyboard case.

18. The keyboard unit as claimed in claim 17, wherein the first and second keyboards are received in the keyboard case in a state of being stacked in parallel to each other, and are capable of being used in an integrated arrangement after they are extracted from the keyboard case.

19. The keyboard as claimed in claim 17, wherein the first and second keyboards are coupled to each other and inclinedly supported by the first and second supporter on the desk in parallel to each other in the longitudinal direction thereof.

20. The keyboard as claimed in claim 17, wherein the cradling unit comprises the open space, and the first supporter occupies the open space when it is received in the keyboard case.

* * * * *